United States Patent [19]

Bogen

[11] Patent Number: 5,133,506
[45] Date of Patent: Jul. 28, 1992

[54] APPARATUS FOR GRINDING MINERAL PRODUCTS

[75] Inventor: Jan O. Bogen, Kvicksund, Sweden

[73] Assignee: Sala International AB, Sala, Sweden

[21] Appl. No.: 662,228

[22] Filed: Feb. 28, 1991

[30] Foreign Application Priority Data

Mar. 7, 1990 [SE] Sweden .................................. 9000797

[51] Int. Cl.⁵ ............................................. B02C 23/00
[52] U.S. Cl. .................................. 241/46.17; 241/172;
366/279
[58] Field of Search .................... 241/172, 46.17;
366/279, 325, 247, 249

[56] References Cited

U.S. PATENT DOCUMENTS

| | | | |
|---|---|---|---|
| 3,149,789 | 9/1964 | Szegvari | 241/172 X |
| 4,244,531 | 1/1981 | Szegvari | 241/172 |
| 4,673,134 | 6/1987 | Barthelmess | 241/172 X |
| 4,850,541 | 7/1989 | Hagy | 241/172 X |
| 4,979,686 | 12/1990 | Szegvari et al. | 241/172 |

FOREIGN PATENT DOCUMENTS

| | | |
|---|---|---|
| 267170 | 5/1988 | European Pat. Off. . |
| 1607476 | 9/1969 | Fed. Rep. of Germany ... 241/46.17 |
| 1757953 | 2/1979 | Fed. Rep. of Germany ...... 241/172 |
| 401618 | 5/1978 | Sweden . |
| 1197582 | 7/1970 | United Kingdom . |

OTHER PUBLICATIONS

Mark's Standard Handbook for Mechanical Engineers © 1978, 8th ed, McGraw Hill Book Co. N.Y. Baumeister et al.-Ed in Chief pp. 6-104 to 6-106.
N. Stehr, "Recent developments in Stirred BAll Milling", Jul. 1987, International Journal of Mineral Processing, 22(1988) 431-444.

Primary Examiner—Mark Rosenbaum
Assistant Examiner—Frances Chin
Attorney, Agent, or Firm—Nils H. Ljungman & Associates

[57] ABSTRACT

The invention relates to apparatus for grinding mineral products and similar hard materials with the aid of a grinding medium agitated by a pin-equipped rotor, and is characterized in that the pins are manufactured of cemented metal carbide.

8 Claims, 2 Drawing Sheets

APPARATUS FOR GRINDING MINERAL PRODUCTS

BACKGROUND OF THE INVENTION

1. Field of the Invention

The invention relates to apparatus for grinding mineral products and similar hard materials with the aid of a medium agitated by a pin rotor, i.e. a rotor equipped with pins.

2. Description of the Prior Art

The technique of grinding or milling material with the aid of an agitated medium (Stirred Ball Milling) has been known for almost 60 years. The industrial breakthrough with this technique was made in 1948 in conjunction with pigment milling in the paint and laquer industries. The technique has been developed progressively over recent years and has been increasingly applied. As a result, many different types of mills in which milling is effected with an agitated medium have been proposed, as is evident, for instance, from an article in International Journal of Mineral Processing, 22 (1988), pages 431-444. One of these mills includes pin-agitator rotors by means of which the necessary milling energy is introduced by forced displacement of the grinding medium.

Due to the ability of the mills to grind or comminute material rapidly to very fine grain sizes, normally within a range of 1-10 microns, grinding with agitated media has been utilized to progressively greater extents with various types of material. Such fine grinding processes are thus employed in the production of fine grain products within the paint and laquer industry, the pharmacological industry, the electronic industry, the agrochemical industry, the food industry, the biotechnical industry, and the rubber, coal and energy industries. Coal-oil-mixtures and coal-water-suspensions are examples of this latter use. The technique of grinding with an agitated medium is also beginning to be applied in mineral technology. For instance, the technique is applied for grinding limestone, kaolin, gypsum, aluminium hydroxide and in the manufacture of paper fillers and paper coating materials. It is evident from this recitation that the majority of applications within the mineral field are concerned solely with "soft" material which is milled relatively easily. One such mill is described in U.S. Pat. No. 4,244 531 with particular reference to milling aluminium powder and cocoa powder, among other things.

In recent time, the use of this technique has been reported in South Africa for the recovery of the precious metal content of pyrites and roasted pyrites, wherein it is found that leaching of extremely small amounts of gold and other precious metals from these products is highly enhanced with particle fineness. It is found, however, that grinding for maximum recovery requires a grinding time of 6-8 hours. EP-A-0 267 170 described the re-grinding of a return product in the processing or enrichment of mineral products, wherein the return product is re-ground with the intention of crushing individual half-grains (i.e. in principle particles which contain both ore and gangue) and with the intention of separating valuable mineral. The regrinding process is carried out in a mill with the aid of an agitated grinding medium and the material is ground to a particle size smaller than $K_{80}=100$ microns. According to the publication, re-grinding is effected with a limited energy input.

The results of the research carried out in recent years show that the fineness of the ground material achieved when grinding with agitated grinding media is contingent solely on the specific energy supply, which can be expressed kwh/tonne of ground material. The results also show that the advantages afforded by this grinding technique over alternative techniques are greatly enhanced with increased fineness of the ground material, i.e. grinding with an agitated grinding medium becomes progressively more attractive with the fineness desired of the final product. Thus, a finer end product requires a higher specific energy input, i.e. a higher specific power input and/or longer grinding time. Obviously, an attempt to achieve greater fineness is initially made with a higher power input, so as not to negatively influence the productivity of the mills. Grinding times of 6-8 hours, as mentioned for instance in connection with pyrite grinding in South Africa, is naturally not as attractive, although in many cases necessary since an increase in power input would place unduly large demands on the ability of the mill to withstand a hard wearing environment, particularly when grinding such hard materials as ores. It has been found that the pin rotor of the mills is primarily subjected to wear much more quickly when the power input is increased. These pins normally consist of non-alloyed steel, although there have been tested steel pins provided with an external hard metal coating with the intention of increasing wear resistance. This hard metal protective coating may also have the form of a sleeve fitted onto the pin and screwed firmly thereto, or in the form of a surface hardened coating applied directly to the steel surface, as proposed in GB-A-1 197 582 for instance.

Hitherto, efforts to increase the power in mills which use pin rotors have failed because of the excessively rapid wear of the pins or because the pins loosen from the rotor, this drawback presenting a serious obstacle which in practice makes it impossible to use this technique for the purpose of processing ores.

There is a progressively increasing need for enabling the power input to be increased when grinding progressively harder materials, for the purpose of producing a progressively finer grinding product when grinding with a grinding medium which is agitated by a pin rotor.

OBJECT OF THE INVENTION

One object of the present invention is to provide apparatus which will enable the aforedescribed grinding technique to be applied effectively in ore processing operations.

SUMMARY OF THE INVENTION

This object is achieved by the inventive apparatus having the characteristic features set forth in the accompanying claims.

Thus, it is surprisingly found that mills in which a grinding medium is agitated with a pin rotor are able to withstand higher power inputs and harder input material under substantially longer operating times without needing to stop for repairs when the rotor pins are made of cemented metal carbide. The pins are preferably detachably from the rotor, or may also be detachable anchored to the rotor, which is normally made of an alloyed steel, for instance a chromium-nickel-steel. It has been found particularly advantageous when two pins form a pin pair with the aid of a holder which is anchored throughout in the rotor. This preferred embodiment provides a simpler technique for anchoring the pins in the rotor, and also reduces the risk of a pin loosening from its anchorage. In the case of this preferred embodiment comprising pairs of pins, the pin-pairs are preferably anchored in said holder with the aid of devices which extend into the rotor, essentially in the longitudinal extension thereof. The anchoring devices may, for instance, have the form of rods or tubes of cylindrical profile or some other profile.

The holder part of the pin pairs located inside the rotor may be substantially flat, in order to enable the pins-pairs to be positioned close together on the rotor in the direction of the longitudinal axis thereof. The pins are preferably anchored in the rotor diametrically in different directions along the rotor and preferably so that two or more pins or pins-pairs are anchored at substantially the same distance from the ends of the rotor.

The pins are suitably configured so that those parts of the pins which are not anchored in the rotor will have a substantially circular cross-section. In normal cases, the cross-sectional diameter of the circular pins will be within the range of 20-50 mm, preferably about 30 mm.

BRIEF DESCRIPTION OF THE DRAWINGS

The invention will now be described in more detail with reference to the accompanying Figures, in which.

DESCRIPTION OF THE PREFERRED EMBODIMENTS

Figure 1:
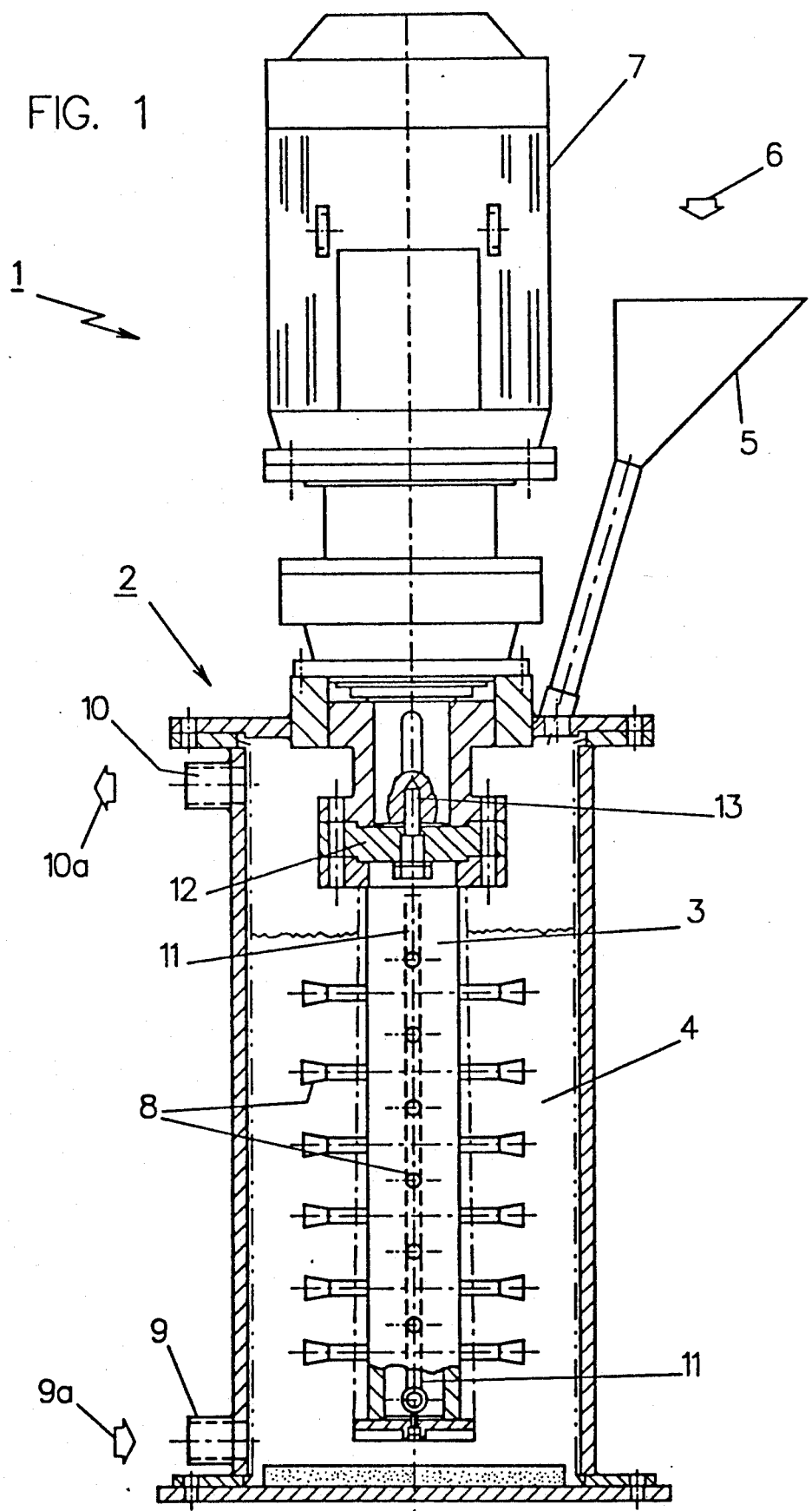
FIG. 1 illustrates schematically and in section a mill which is provided with a pin rotor.

FIG. 1 is a sectional view of a mill 1 having a rotor 3 by means of which a grinding medium is agitated. The mill 1 includes a grinding chamber 2 in which the rotor 3 is mounted in the vertical extension of the chamber. The grinding chamber 2 contains a grinding medium 4 in the form of a particulate, hard material, mineral or metal alloy, having a particle size of between 0.2 and 12 mm. It is also possible to use coarser particles of the material being ground as grinding medium or bodies, in which case the process will be a so-called autogenous grinding process. The grinding medium 4 is introduced through a funnel 5, as indicated by the arrow 6, until there is reached in the grinding chamber 2 a level which corresponds approximately to 75-80% of the volumetric capacity of the chamber. The rotor 3 located in the chamber 2 is driven by a motor 7 which is mounted above the chamber 2 and which supplies power to the chamber 2 through the intermediary of a coupling arrangement 12 and a bolt joint 13, which secures the rotor 3 axially. The rotor 3 has a number of pins 8 disposed along its longitudinal axis. The pins 8 are arranged in pairs, partly in the section plane and partly in a plane transversal to this section plane. These latter pins 8 are therefore shown as circles in the drawing.

The pins 8 are anchored in the rotor 3 by means of an anchoring device 11 which extends through a pin holder, not shown.

The material to be ground is introduced through an inlet aperture 9, as indicated by the arrow 9a, and is caused to pass upwardly through the agitated medium 4 in the grinding chamber 2. The material may be introduced in the form of an aqueous suspension or slurry for wet grinding purposes, or in a dry form for dry grinding purposes. The finished ground material is removed through an outlet 10, as indicated by the arrow 10a. The mill 1 can operate with or without cooling. When cooling is desired, for instance when dry grinding, a coolant is delivered to a cooling jacket (not shown) said coolant being introduced to the upper part of the grinding chamber 2 and removed at or close to the bottom thereof.

Figure 2:
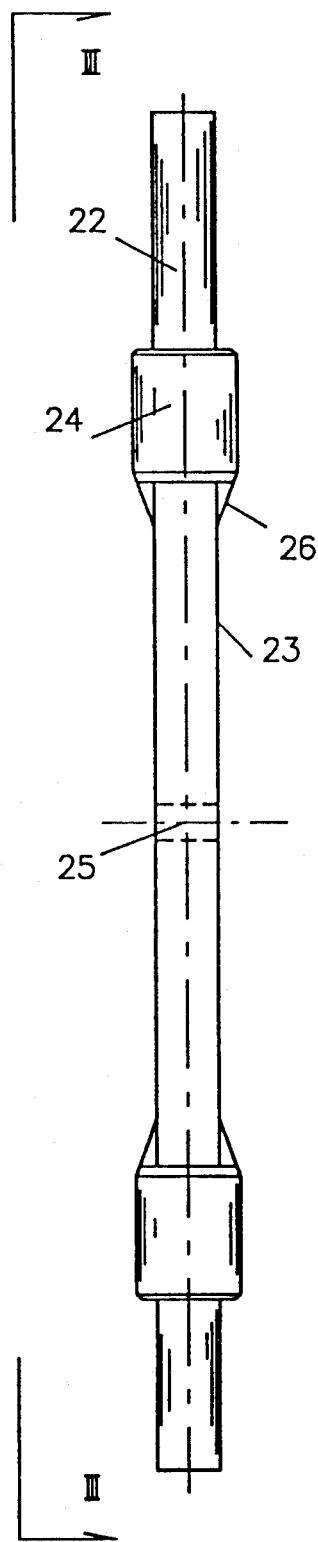
FIG. 2 illustrates a preferred embodiment of pins arranged in pairs and FIG. 3 illustrates another view of the pin-pair of FIG. 2 taken along line III—III.
Figure 3:
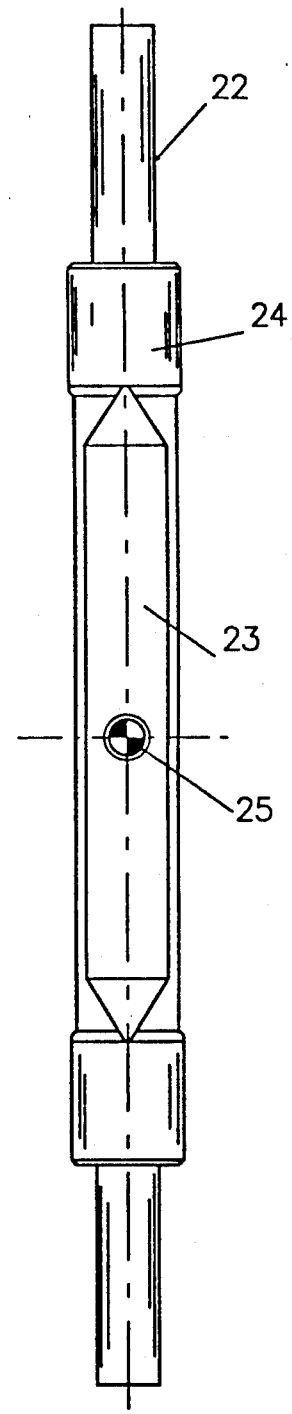

FIG. 2 illustrates from one side and from above a preferred embodiment of a pin pair, generally referenced 21.

The pin pair 21 is produced in several, mutually joined pieces and comprises cylindrical pin parts 22 and a holder 23 which joins said pin parts and which has cylindrical abutment parts 24 and an intermediate holder part, here shown to have a rectangular cross-section. Located centrally in the holder 23 is a circular hole 25 which is intended to receive an anchoring device, in the manner illustrated in FIG. 1. The holder 23 may alternatively have a circular configuration, although the flat rectangular configuration of the illustrated embodiment enables adjacent pin-pairs 21 to be anchored close together, therewith enabling more pin-pairs to be mounted on the rotor for each unit of rotor length.

The inventive apparatus enables minerals to be ground to extremely fine grain sizes with a considerable saving in energy as compared with conventional grinding techniques. A typical figure in this respect is an energy consumption in kWh/tonne which is only 0.50-0.66 of the amount of energy consumed in a conventional grinding process. Another important advantage afforded by the invention is that the mills become much smaller volumetrically, therewith enabling the mills to be positioned more readily and to be made more flexible, for instance the mills can be readily placed in the proximity of those units from which the material arrives, without needing to pump the material over long distances, which requires a large energy input.

EXAMPLE

When carrying out tests for grinding minerals down to grain sizes smaller than 0.1 mm, it was found that the inventive cemented metal carbide pins had an effective life span of between 3000 and 5000 hours. This life span is expressed as the number of hours over which the pins carried out their intended function in a grinding process. Pins provided with outer, hard layers or coatings in accordance with the earlier standpoint of techniques were also tested.

Thus, pins provided with hard metal sleeves had a much shorter effective life, less than 100 hours, due to the fact that the anchoring devices, the screws, were worn down quickly, therewith causing the sleeves to loosen and be quickly destroyed in the mill. Pins coated with tungsten carbide to a thickness of 0.10-0.12 mm had an effective life of between 100 and 150 hours. This result was taken to indicate that the effective life of surface hardened pins is, at best, substantially proportional to the thickness of the surface hardened casing. In several instances, however, the effective life of the pins was shorter due to local erosion and exposure of the underlying steel pins, which apparently resulted in rapid immediate wear of the pins, causing the pins to break off.

I claim:

1. In an apparatus for grinding mineral products and similar hard materials with the aid of a grinding medium agitated by a pin rotor, the improvement comprising:
   at least one pin mounted on the rotor, said at least one pin comprising cemented metal carbide.

2. Apparatus according to claim 1, wherein the at least one pin is detachably anchored in the rotor.

3. Apparatus according to claim 1 or 2, wherein:
   the at least one pin comprises at least two pins;
   two of the at least two pins form a pin-pair;
   the two of the at least two pins of the pin-pair are integrally connected by means of a pin holder; and
   the pin holder is for being anchored in the rotor.

4. Apparatus according to claim 3, characterized in that the pin holder is for being anchored in the rotor with the aid of anchoring devices which pass through a hole in the pin holder and extend into the rotor, substantially in its longitudinal direction.

5. Apparatus according to claim 4, characterized in that the pin-pair holder comprises a portion for being anchored in the rotor, and the portion for being anchored is substantially flat.

6. Apparatus according to claim 5, characterized in that the pins are anchored diametrically in different directions along the rotor.

7. Apparatus according to claim 6, characterized in that the rotor has a first end and a second end and at least one of:
   at least two pins, and
   at least two pin-pairs are anchored at substantially the same distance from each of the ends of the rotor.

8. Apparatus according to claim 7, characterized in that the pin holder comprises a portion extending away from the portion for being anchored, and the extending portion has a substantially circular cross-section.

* * * * *